US010442927B2

(12) United States Patent
Jeon et al.

(10) Patent No.: US 10,442,927 B2
(45) Date of Patent: Oct. 15, 2019

(54) FLAME-RETARDANT POLYPHENYLENE ETHER RESIN COMPOSITION HAVING HIGH RIGIDITY AND HIGH IMPACT STRENGTH

(71) Applicants: HYUNDAI MOTOR COMPANY, Seoul (KR); Hyundai EP Co., Ltd., Dangjin-si, Chungcheongnam-do (KR)

(72) Inventors: Sang Soo Jeon, Uiwang-si (KR); Seung Woo Choi, Seoul (KR); Tae Seung Lee, Suwon-si (KR); Hee Gu Yeo, Anyang-si (KR); Yong Ki Hwang, Dangjin-si (KR); Dong Bum Seo, Dangjin-si (KR)

(73) Assignees: Hyundai Motor Company, Seoul (KR); Hyundai EP CO., Ltd., Dangjin-Si, Chungcheongnam-Do (KR)

(*) Notice: Subject to any disclaimer, the term of this patent is extended or adjusted under 35 U.S.C. 154(b) by 217 days.

(21) Appl. No.: 14/959,475

(22) Filed: Dec. 4, 2015

(65) Prior Publication Data
US 2017/0044368 A1  Feb. 16, 2017

(30) Foreign Application Priority Data

Aug. 12, 2015  (KR) .................. 10-2015-0113913

(51) Int. Cl.
*C08L 71/12* (2006.01)
*C08L 23/08* (2006.01)
(Continued)

(52) U.S. Cl.
CPC .............. *C08L 71/126* (2013.01); *C08J 5/04* (2013.01); *C08K 7/14* (2013.01); *C08K 7/28* (2013.01);
(Continued)

(58) Field of Classification Search
CPC ....... C08L 63/00–10; C08L 71/12–126; C08L 25/08–16; C08L 9/06; C08L 23/0884;
(Continued)

(56) References Cited

U.S. PATENT DOCUMENTS 3,708,455 A * 1/1973 Nakanishi ................ C08J 5/043
524/502
3,952,072 A * 4/1976 Yonemitsu ................ B01J 2/00
524/100
(Continued)

FOREIGN PATENT DOCUMENTS

JP         2009024064 A    2/2009
KR   10-1995-0009756       8/1995
(Continued)

OTHER PUBLICATIONS

Machine translation of KR 20140131652 A.*

*Primary Examiner* — Kregg T Brooks
(74) *Attorney, Agent, or Firm* — Brinks Gilson & Lione

(57) ABSTRACT

Disclosed is a flame-retardant polyphenylene ether resin composition having high rigidity and high impact strength. More particularly, disclosed is a flame-retardant polyphenylene ether resin composition having high rigidity and high impact strength which enhances environmental stress cracking resistance and impact resistance, compared to general materials, while exhibiting superior mechanical strength such as flame retardancy, tensile strength, flexural strength, flexural modulus, etc. through addition of particularly glass fiber, maleic anhydride-grafted polyphenylene ether, a thermoplastic styrenic elastomer, an ethylene terpolymer and an epoxy resin to a polyphenylene ether resin, and thus, may be used as a material of automobile battery cell modules or electric/electronic components.

12 Claims, 1 Drawing Sheet (a)

(b)

(51) Int. Cl.
| | |
|---|---|
| *C08L 25/08* | (2006.01) |
| *C08L 33/14* | (2006.01) |
| *C08L 9/06* | (2006.01) |
| *C08K 7/14* | (2006.01) |
| *C08L 53/02* | (2006.01) |
| *C08L 63/00* | (2006.01) |
| *C08J 5/04* | (2006.01) |
| *C08K 13/04* | (2006.01) |
| *C08K 5/00* | (2006.01) |
| *C08K 5/523* | (2006.01) |
| *C08L 51/04* | (2006.01) |
| *C08L 51/06* | (2006.01) |
| *C08L 51/08* | (2006.01) |
| *C08K 7/28* | (2006.01) |

(52) U.S. Cl.
CPC ............ *C08L 9/06* (2013.01); *C08L 23/0884* (2013.01); *C08L 25/08* (2013.01); *C08L 51/04* (2013.01); *C08L 51/06* (2013.01); *C08L 51/08* (2013.01); *C08L 53/02* (2013.01); *C08L 63/00* (2013.01); *C08L 71/12* (2013.01); *C08L 71/123* (2013.01)

(58) Field of Classification Search
CPC .......... C08L 51/04; C08L 51/06; C08L 51/08; C08L 53/02; C09D 163/00–10; C09D 171/12; C09D 125/08–16; C09D 109/06; C09D 123/0884; C09D 151/04; C09D 151/06; C09D 151/08; C09D 153/02; C09J 163/00–10; C09J 171/12; C09J 125/08–16; C09J 109/06; C09J 123/0884; C09J 151/04; C09J 151/06; C09J 151/08; C09J 153/02; C08J 2371/12; C08J 2325/08–16; C08J 2309/06; C08J 2323/08; C08G 65/44; C08G 65/485; C08K 7/14

See application file for complete search history.

(56) References Cited

U.S. PATENT DOCUMENTS

| | | | | |
|---|---|---|---|---|
| 4,668,723 | A | | 5/1987 | Bussink et al. |
| 4,914,153 | A | * | 4/1990 | Togo ................ C08L 51/06 525/145 |
| 5,019,616 | A | | 5/1991 | Avakian et al. |
| 5,302,666 | A | * | 4/1994 | Hino ................ C08G 59/38 525/109 |
| 5,326,813 | A | * | 7/1994 | Okada ............... C08F 283/08 524/508 |
| 5,939,490 | A | * | 8/1999 | Brown ............... C08L 23/04 525/132 |
| 6,028,130 | A | * | 2/2000 | Weber ................ C08K 5/51 524/126 |
| 2002/0142250 | A1 | * | 10/2002 | Kita ................ B41C 1/1016 430/302 |
| 2007/0049690 | A1 | * | 3/2007 | Borade ............... C08L 67/00 525/92 D |
| 2014/0234619 | A1 | * | 8/2014 | Shan ................ C08K 3/38 428/366 |

FOREIGN PATENT DOCUMENTS

| | | |
|---|---|---|
| KR | 10-0148399 | 2/1999 |
| KR | 10-0302417 | 9/2001 |
| KR | 10-2012-0078448 | 7/2012 |
| KR | 20140131652 A | 11/2014 |
| KR | 20140131654 A | 11/2014 |
| WO | 2007/027387 A1 | 3/2007 |

* cited by examiner

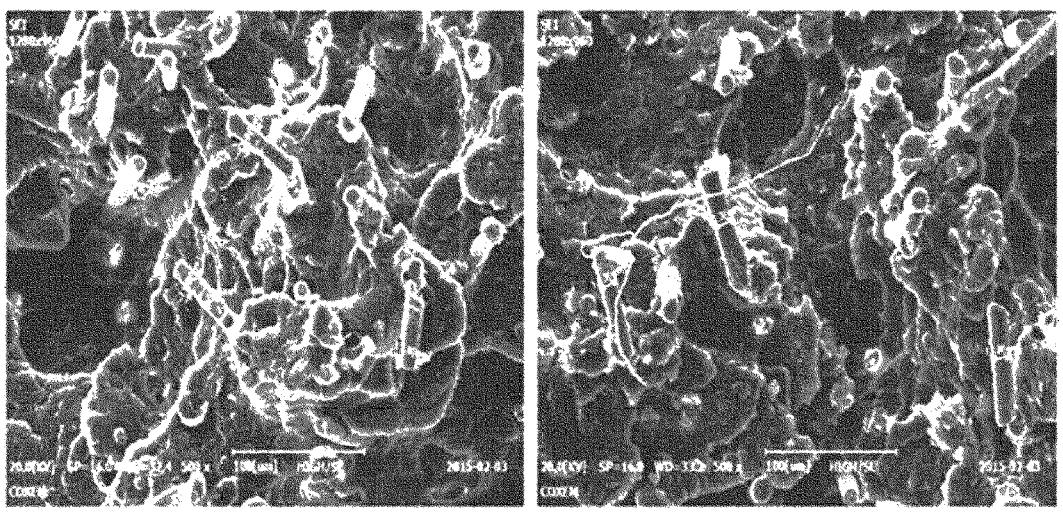
(a)            (b)

FLAME-RETARDANT POLYPHENYLENE ETHER RESIN COMPOSITION HAVING HIGH RIGIDITY AND HIGH IMPACT STRENGTH

CROSS-REFERENCE TO RELATED APPLICATIONS

This application claims the benefit of Korean Patent Application No. 10-2015-0113913 filed on Aug. 12, 2015, the entire contents of which are incorporated herein by reference.

FIELD

The present disclosure relates to a flame-retardant polyphenylene ether resin composition having high rigidity and high impact strength, and more particularly to a flame-retardant polyphenylene ether resin composition having high rigidity and high impact strength which enhances environmental stress cracking resistance and impact resistance, compared to general materials, while exhibiting superior mechanical strength such as flame retardancy, tensile strength, flexural strength, flexural modulus, etc., and thus, may be used as a material of automobile battery cell modules or electric/electronic components.

BACKGROUND

The statements in this section merely provide background information related to the present disclosure and may not constitute prior art.

Polyphenylene ether-based resins are engineering plastic materials having superior mechanical and electric characteristics, heat resistance, dimensional stability, a low moisture absorption ratio, and creep properties at high temperature, and are widely used in automobile and electric/electronic components which require measured precise measurement. In addition, polyphenylene ether-based resins of engineering plastics have low specific gravity and thus, to decrease energy consumption through weight reduction, a variety of research into polyphenylene ether-based resins is actively underway.

However, moldability of polyphenylene ether-based resins is deficient due to high melt viscosity thereof. In addition, when polyphenylene ether-based resins are used alone, injection moldability and appearance of molded products are poor due to low solvent resistance and impact resistance thereof. Accordingly, polyphenylene ether-based resins are mixed with a compatible/incompatible resin such as polystyrene to compensate for such disadvantages, and such mixed resins are used in the art.

However, when a polyphenylene ether resin is mixed with a polystyrene resin, processability is enhanced, but impact resistance is decreased. In order to address such a disadvantage, a rubber-modified polystyrene resin is also added, and thus, mechanical properties are enhanced.

However, when such a polyphenylene ether resin is exposed to a specific chemical material for a long time, environmental stress cracking (ESCR) occurs. Accordingly, application thereof to reservoirs, containers or cables exposed to stress for a long time is limited.

A variety of methods to enhance ESCR have been suggested. However, a resin that satisfies overall properties required in an engineering plastic, such as mechanical properties, impact resistance, heat resistance, etc., along with ESCR is under development.

SUMMARY

The present disclosure provides a flame-retardant polyphenylene ether resin composition having high rigidity and high impact strength which enhances environmental stress cracking resistance and impact resistance, compared to general materials, while exhibiting superior mechanical strength such as flame retardancy, tensile strength, flexural strength, flexural modulus, etc. through addition of particularly glass fiber, maleic anhydride-grafted polyphenylene ether, a thermoplastic styrenic elastomer, an ethylene terpolymer and an epoxy resin to a polyphenylene ether resin, and thus, may be used as a material of automobile battery cell modules or electric/electronic components.

The present disclosure also provides a flame-retardant polyphenylene ether resin composition having superior mechanical strength, impact resistance and flame retardancy while enhancing environmental stress cracking resistance.

In one aspect, the present disclosure provides a flame-retardant polyphenylene ether resin composition having high rigidity and impact strength including 20 to 50% by weight of polyphenylene ether, 4 to 10% by weight of maleic anhydride-grafted polyphenylene ether, 10 to 40% by weight of a rubber-modified polystyrene resin, 1 to 5% by weight of a thermoplastic styrenic elastomer, 1 to 5% by weight of an ethylene terpolymer in which ethylene, methyl acrylate and glycidyl methacrylate are copolymerized, and 5 to 20% by weight of glass fiber.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 illustrates SEM images of fractures of (a) a flame-retardant resin composition to which an epoxy resin is not added and (b) a flame-retardant resin composition to which an epoxy resin is added according to the present invention.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a flame-retardant polyphenylene ether resin composition having high rigidity and impact strength including 20 to 50% by weight of polyphenylene ether, 4 to 10% by weight of maleic anhydride-grafted polyphenylene ether, 10 to 40% by weight of a rubber-modified polystyrene resin, 1 to 5% by weight of a thermoplastic styrenic elastomer, 1 to 5% by weight of an ethylene terpolymer including copolymerized ethylene, methyl acrylate and glycidyl methacrylate, and 5 to 20% by weight of glass fiber.

(1) Polyphenylene Ether Resin

In one form of the present disclosure, the polyphenylene ether may be a compound represented by Formula 1 below:

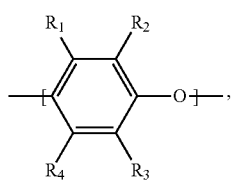

[Formula 1]

wherein $R_1$ to $R_4$ are each independently a substituent of any one selected from the group consisting of hydrogen-substituted or unsubstituted $C_1$ to $C_{30}$ alkyl, hydrogen-substituted or unsubstituted $C_1$ to $C_{30}$ haloalkyl, hydrogen-substituted or unsubstituted $C_1$ to $C_{30}$ aminoalkyl, hydrocarboxy, halohydrocarboxy, hydrogen-substituted or unsubstituted $C_6$ to $C_{30}$ aryl, hydrogen-substituted or unsubstituted $C_3$ to heteroaryl and hydrogen-substituted or unsubstituted $C_3$ to $C_{30}$ cycloalkyl.

As a specific example, the polyphenylene ether may be one or more selected from the group consisting of poly(2,6-dimethyl-1,4-phenylene)ether, poly(2,6-diethyl-1,4-phenylene)ether, poly(2,6-dipropyl-1,4-phenylene)ether, poly(2,6-dibutyl-1,4-phenylene)ether, poly(2,6-diaryl-1,4-phenylene)ether, poly(2-methyl-6-ethyl-1,4-phenylene)ether, poly(2-methyl-6-propyl-1,4-phenylene)ether, poly(2-methyl-6-tolyl-1,4-phenylene)ether, poly(2-methyl-6-butyl-1,4-phenylene)ether, poly(2-ethyl-6-propyl-1,4-phenylene)ether, poly(2,6-diphenyl-1,4-phenylene)ether, poly(2,6-dimethoxy-1,4-phenylene)ether, poly(2,6-diethoxy-1,4-phenylene)ether, poly(2,3,6-trimethyl-1,4-phenylene)ether, a copolymer of poly(2,6-dimethyl-1,4-phenylene)ether and poly(2,3,6-trimethyl-1,4-phenylene)ether, and a copolymer of poly(2,6-dimethyl-1,4-phenylene)ether and poly(2,3,5,6-tetramethyl-1,4-phenylene)ether, but the present disclosure is not limited thereto.

The polyphenylene ether may be particularly a copolymer of poly(2,6-dimethyl-1,4-phenylene)ether and poly(2,3,6-trimethyl-1,4-phenylene)ether, or poly(2,6-dimethyl-1,4-phenylene)ether, more particularly poly(2,6-dimethyl-1,4-phenylene)ether.

The polymerization degree or the molecular weight of polyphenylene ether is not specifically limited, and, when heat stability, workability, etc. of the thermoplastic resin composition are considered, intrinsic viscosity thereof in a 25° C. chloroform solvent is preferably 0.1 to 0.9 dl/g, more preferably 0.3 to 0.6 dl/g. When the intrinsic viscosity is less than 0.1 dl/g, the molecular weight is decreased and thus liquidity is enhanced, but heat resistance is decreased and thus gas is generated on appearance of molded product. Accordingly, it is challenging to obtain mechanical properties. When the intrinsic viscosity is greater than 0.9 dl/g, liquidity is decreased and thus, upon injection-molding, injection pressure and temperature increase and variation in molded products increases.

In one form of the present disclosure, the polyphenylene ether may be used in an amount of 20 to 50% by weight based on the weight of a total of compositions. When the amount is less than 20% by weight, mechanical properties and heat resistance are decreased. When the amount is greater than 50% by weight, impact strength may be decreased, and injection flowability and electric insulation may be decreased.

(2) Maleic Anhydride-Grafted Polyphenylene Ether Resin

In one form of the present disclosure, the maleic anhydride-grafted polyphenylene ether may be grafted with 0.3 to 1% by weight of maleic anhydride. In particular, when the amount of the maleic anhydride is less than 0.3% by weight, compatibility with glass fiber is decreased, and strength, stiffness and impact strength are decreased. When the amount of the maleic anhydride is greater than 1% by weight, viscosity is increased and thus, upon reaction extrusion, molding becomes difficult.

In addition, when measured in a 25° C. chloroform solvent, the maleic anhydride-grafted polyphenylene ether may have particularly an intrinsic viscosity of 0.1 to 0.9 dl/g, more particularly 0.3 to 0.6 dl/g. In addition, maleic anhydride-grafted polyphenylene ether may be prepared by mixing and extruding a polyphenylene ether resin, maleic anhydride and an initiator.

The maleic anhydride-grafted polyphenylene ether resin may be used in an amount of 4 to 10% by weight based on the weight of a total of compositions. When the amount is less than 4% by weight, liquidity of a resin composition is enhanced, but tensile strength, flexural strength and flexural modulus may be decreased. When the amount is greater than 10% by weight, tensile strength, flexural strength and flexural modulus are not further increased, a melt viscosity of a resin composition is increased, and liquidity is rapidly decreased, resulting in deterioration of moldability.

3) Rubber-Modified Polystyrene Resin

In one form of the present disclosure, the rubber-modified polystyrene resin may be a copolymer of a monomer copolymerizable with a styrene-based monomer and the styrene-based monomer or a styrene-based graft copolymer. The rubber-modified polystyrene resin may be used in an amount of 10 to 40% by weight based on the weight of a total of compositions. When the amount is less than 10% by weight, processability, impact properties and chemical resistance are decreased. When the amount is greater than 40% by weight, heat resistance and mechanical properties deteriorate.

In one form of the present disclosure, the styrene-based monomer may be one or more selected from the group consisting of styrene, α-methylstyrene and p-methylstyrene, and a monomer copolymerizable with the styrene-based monomer is one or more selected from the group consisting of vinyl cyanide monomers, (meth)alkyl ester acrylate monomers and maleimide-based monomers. In particular, examples of the monomer copolymerizable with the styrene-based monomer include a vinyl cyanide monomer such as acrylonitrile, methacrylonitrile, or the like; a (meth)alkyl ester acrylate monomer such as methyl acrylate, ethyl acrylate, propyl acrylate, methyl methacrylate, ethyl methacrylate, or the like; and a maleimide-based monomer such as maleimide, N-phenylmaleimide, or the like. Particularly, a vinyl cyanide monomer or a (meth)alkyl ester acrylate monomer may be used. In addition, as a copolymer of the monomer copolymerizable with the styrene-based monomer and styrene monomer, an acrylonitrile-styrene resin (AS resin) may be used.

In one form of the present disclosure, the styrene-based graft copolymer may be one or more selected from the group consisting of an impact-resistant polystyrene resin (HIPS resin), an acrylonitrile-butadiene-styrene resin (ABS resin), an acrylonitrile-ethylene propylene rubber-styrene resin (AES resin) and an acrylonitrile-acrylate-styrene resin (AAS resin).

In addition, as a method of preparing the styrene-based copolymer, a method such as emulsion polymerization, solution polymerization, suspension polymerization or bulk polymerization may be used.

(4) Styrenic Thermoplastic Elastomer

In one form of the present disclosure, the thermoplastic styrenic elastomer is derived from a vinyl aromatic monomer and may be a block or triblock copolymer having an AB, ABA or ABC shape. In addition, a copolymer composed of the vinyl aromatic monomer and a hydrogenated, partially hydrogenated, or non-hydrogenated unsaturated diene block may be used.

In particular, the thermoplastic styrenic elastomer may be an AB diblock-type block copolymer. Examples of the AB diblock-type block copolymer include a polystyrene-polyisoprene copolymer, a polyalphamethylstyrene-polybutadiene copolymer, and hydrogenated copolymers thereof. Such an AB diblock-type block copolymer is commercially available and representative examples thereof include Kraton® D and Kraton® G available from Kraton, and Solprene® and K-resin® available from Philips.

In addition, examples of an ABA triblock-type copolymer used as the thermoplastic styrenic elastomer include copolymers such as polystyrene-polybutadiene-polystyrene, polystyrene-polyisoprene-polystyrene, polyalphamethylstyrene-polybutadiene-polyalphamethylstyrene and polyalphamethylstyrene-polyisoprene-polyalphamethylstyrene, and hydrogenated copolymers thereof.

In general, the thermoplastic styrenic elastomer may further include an oil. The oil is classified into paraffin-based, naphthene-based and aromatic oils according to ingredients thereof. In the present disclosure, a paraffin-based oil, which is advantageous in regard to light resistance and weather resistance, is used in one form.

In general, in regard to oil input, an indirect input method using an oil field grade of oil, a method of previously kneading the thermoplastic styrenic elastomer and oil, or a method of directly inputting oil to a manufacturing device of a thermoplastic elastomer may be used. The content of oil is in one form 50 to 3000 parts by weight, and more particularly 100 to 1000 parts by weight, based on 100 parts by weight of elastomer.

The amount of the thermoplastic styrenic elastomer is in one form 1 to 5% by weight based on a total of compositions. When the amount is less than 1% by weight, impact properties may deteriorate. When the amount is greater than 5% by weight, heat resistance and mechanical properties may deteriorate.

(5) Ethylene Terpolymer in Which Ethylene, Methyl Acrylate and Glycidyl Methacrylate are Copolymerized In one form of the present disclosure, the ethylene terpolymer may be a copolymer including 55 to 75% by weight of ethylene, 20 to 30% by weight of methyl acrylate and 5 to 15% by weight of glycidyl methacrylate. Particularly, 68% by weight of ethylene, 24% by weight of methylacrylate and 8% by weight of glycidyl methacrylate may be included. In addition, the ethylene terpolymer may be included in an amount of 1 to 5% by weight based on a total of compositions. When the amount is less than 1% by weight, impact properties may deteriorate. When the amount is greater than 5% by weight, impact properties are enhanced, but the viscosity of a composition is rapidly increased due to increased reactivity and thus appearance and moldability deterioration may occur.

In one form of the present disclosure, the ethylene terpolymer may have a melting index of 4 to 8 g/10 min (190° C., 2.16 kg) based on ASTM D1238.

(6) Glass Fiber

In one form of the present disclosure, the glass fiber is useful for enhancing environmental stress cracking resistance and impact resistance, and may be surface-treated with epoxysilane.

In one form of the present disclosure, the glass fiber may have an average length of 1 to 10 mm and an average diameter of 5 to 15 μm. In one form, the average length is 4 mm and the average diameter is 10 μm.

(7) Flame Retardant

In one form of the present disclosure, the flame-retardant polyphenylene ether resin composition may further include 5 to 10% by weight of a flame retardant, 0.1 to 1% by weight of an epoxy resin, 0.1 to 2% by weight of an antioxidant and 0.1 to 2% by weight of a dispersing agent.

In one form of the present disclosure, the flame retardant is mixed to provide flame retardancy to the resin composition. As the flame retardant, a mixture of aromatic polyphosphate and melamine polyphosphate may be used. In particular, a halogen-containing flame retardant has excellent flame retardancy, but environmental and health problems may be caused. Aromatic polyphosphate as a non-halogen flame retardant is less harmful and toxic than the halogen flame retardant and may be easily handled. When heat is applied to the melamine polyphosphate, melamine is decomposed and thus melamine and phosphate are respectively condensed. Flame retardancy thereof may mainly occur by endothermic reaction and a mechanism of a condensation process.

Polyphosphate as a flame retardant functions as a dehydrogenation catalyst and exhibits flame retardancy by inducing charcoal formation. When polyphosphate is thermally decomposed, toxic gas is not generated and a flame generation amount is small, compared to other flame retardants.

(8) Epoxy Resin

In one form of the present disclosure, the epoxy resin may have an equivalent of 2,200 to 4,000 g/eq, an epoxy value of 0.035 to 0.045 eq/100 g, and a softening point of 120 to 150° C. In particular, when the equivalent is lower than 2,200 g/eq, liquidity of a resin is enhanced, but chemical resistance and tensile strength are decreased. When the equivalent is higher than 4,000 g/eq, a melt viscosity of a material is increased and thus product appearance and moldability deteriorate.

The epoxy resin is commercially available, and, for example, YD-019K or BRENNTAG EPIKOTE 1009 available from KUKDO CHEMICAL CO., LTD., ER609R available from API Corporation, or the like may be used. In this regard, the epoxy resin may be used without limitation within the teachings and scope of the present disclosure.

The epoxy resin in one form is used in an amount of 0.1 to 1% by weight based on the weight of a total of compositions. When the amount is less than 0.1% by weight, tensile strength increase effects are small. When the amount is greater than 1% by weight, the viscosity of a material is increased and thus, upon injection, flowability is decreased, thereby decreasing moldability.

(9) Other Additives

In addition, additives such as a heat stabilizer, an inorganic additive, a light stabilizer, a pigment and a dye may be added depending upon a resin preparation method.

Accordingly, the flame-retardant polyphenylene ether resin composition according to the present disclosure exhibits superior flame retardancy and superior mechanical strength such as superior tensile strength, flexural strength, flexural modulus through addition of particularly glass fiber, maleic anhydride-grafted polyphenylene ether, a thermoplastic styrenic elastomer, an ethylene terpolymer and an epoxy resin to the polyphenylene ether resin.

In addition, due to the addition of glass fiber, environmental stress cracking resistance and impact resistance are enhanced, compared to a conventional material. Accordingly, the flame-retardant polyphenylene ether resin composition according to the present disclosure having such enhanced environmental stress cracking resistance and impact resistance may be utilized as a material of automobile battery cell modules or electric/electronic components requiring superior mechanical properties, flame retardancy and impact resistance.

Now, the present disclosure will be described in more detail with reference to the following examples. These examples are provided only for illustration of the present invention and should not be construed as limiting the scope and spirit of the present disclosure.

Examples 1 to 4 and Comparative Examples 1 to 8

Using compositions summarized in Tables 1 and 2, flame-retardant thermoplastic resin compositions were prepared, and each of the prepared compositions was dried for three hours in an 80° C. dehumidifying dryer. Subsequently, the resin compositions were injection-molded in a cylinder temperature of 240 to 280° C. and a mold temperature of 60 to 80° C. using an injection molding machine, thereby manufacturing a test piece.

[Ingredients]

A) Polyphenylene ether: Poly(2,6-dimethyl-phenylether) (PX-100F, Mitsubishi Corporation Ltd., Japan), powder particles, average particle diameter: several micrometers B) Rubber-modified polystyrene resin: Impact-resistant polystyrene-based resin (HIPS) (S834, HYUNDAI ENGINEERING PLASTICS, Republic of Korea)

C) Glass fiber: Having an average length of 4 mm and an average diameter of 10 μm, and surface-treated with epoxysilane (G/F 910-10P, OWENS CORNING KOREA)

D) Maleic anhydride-grafted polyphenylene ether (YC-072, HYUNDAI ENGINEERING PLASTICS, Republic of Korea) (0.7% by weight of maleic anhydride is grafted)

E) Thermoplastic styrenic elastomer: Block copolymer of styrene-ethylene-butylene-styrene (SEPTON 8007, Kuraray, Japan)

F) Ethylene terpolymer: Copolymer including 68% by weight of ethylene, 24% by weight of methylacrylate and 8% by weight of glycidyl methacrylate (LOTADER AX8900, ARKEMA)

G) Epoxy resin: Having an equivalent of 2,200 to 4,000 g/eq and a softening point of 135 to 150° C.

H) Flame retardant: Aromatic polyphosphate (PX-200, DAIHACHI, Japan)

I) Flame retardant: Melamine polyphosphate (OP-1312, Clariant, US)

J) Antioxidant: BASF IRGANOX 1098 and PEP-36(K) mixed in a ratio of 1:1

K) Dispersing agent: E WAX (VOLPKER, Germany)

TABLE 1

| Composition (% by weight) | Examples | | Comparative Examples | | | | |
|---|---|---|---|---|---|---|---|
| | 1 | 2 | 1 | 2 | 3 | 4 | 5 |
| A | 33.83 | 38.83 | 45.76 | 43.56 | 43.23 | 39.16 | 39.16 |
| B | 31.77 | 36.77 | 37.44 | 35.64 | 35.37 | 32.04 | 32.04 |
| C | 15 | 5 | 10 | 10 | 10 | 10 | 10 |
| D | 4 | 4 | — | 4 | 4 | 4 | 4 |
| E | 4 | 4 | — | — | — | 8 | 4 |
| F | 4 | 4 | — | — | — | — | 4 |
| G | 0.6 | 0.6 | — | — | 0.6 | — | — |
| H | 4 | 4 | 4 | 4 | 4 | 4 | 4 |
| I | 2 | 2 | 2 | 2 | 2 | 2 | 2 |
| J | 0.5 | 0.5 | 0.5 | 0.5 | 0.5 | 0.5 | 0.5 |
| K | 0.3 | 0.3 | 0.3 | 0.3 | 0.3 | 0.3 | 0.3 |
| Total | 100 | 100 | 100 | 100 | 100 | 100 | 100 |

TABLE 2

| Composition (% by weight) | Examples | | Comparative Examples | | |
|---|---|---|---|---|---|
| | 3 | 4 | 6 | 7 | 8 |
| A | 38.83 | 35.53 | 41.03 | 39.93 | 34.43 |
| B | 31.77 | 29.03 | 33.57 | 32.67 | 28.17 |
| C | 10 | 10 | 10 | 10 | 10 |
| D | 4 | 10 | 0 | 2 | 12 |
| E | 4 | 4 | 4 | 4 | 4 |
| F | 4 | 4 | 4 | 4 | 4 |
| G | 0.6 | 0.6 | 0.6 | 0.6 | 0.6 |
| H | 4 | 4 | 4 | 4 | 4 |
| I | 2 | 2 | 2 | 2 | 2 |
| J | 0.5 | 0.5 | 0.5 | 0.5 | 0.5 |
| K | 0.3 | 0.3 | 0.3 | 0.3 | 0.3 |
| Total | 100 | 100 | 100 | 100 | 100 |

Test Example

Tensile strength, elongation, flexural modulus, Izod impact strength, environmental stress cracking resistance and flame retardancy of test pieces according to each of Examples 1 to 4 and Comparative Examples 1 to 8 were measured. In particular, five test pieces were measured, and, except an upper limit and a lower limit thereof, an average of remaining values is summarized in Tables 4 and 5 below and FIG. 1.

[Measurement Method]

(1) Flow index (g/10 min): ASTM D1238, measurement temperature of 285° C., measurement load of 5 kg (2) Tensile strength (MPa): STM D 638, measurement speed of 5 mm/min (3) Flexural strength (MPa): ASTM D790, specimen thickness of 6.4 mm, measurement speed of 3 mm/min (4) Flexural elasticity (MPa): ASTM D790, specimen thickness of 6.4 mm, measurement speed of 3 mm/min (5) Izod notch impact strength (J/m): ASTM D256, specimen thickness of 6.4 mm, notch was made using a notching machine for measurement.

(6) ESCR (120 hours): An ASTM D638 TYPE 1 specimen for tensile properties testing was tightened with a clamp while adding 1% strain thereto using a previously prepared metal zig, and was soaked in a standard reagent (ethylene carbonate/propylene carbonate/di-ethyl carbonate=1/1/1 (vol %), LiPF6 1 mol/L) for a while. After standing for 120 hours, the specimen was observed to confirm crack generation.

(7) Flame retardancy (UL 94, 1.5 mm): An UL 94 test method as a regulated method by Underwriter's Laboratory Inc., US was used (a vertically standing test piece was impinged with flame for 10 seconds, and then flame time or dripping properties were evaluated. Flame time is a continued flaming time length of the test piece after estranging an ignition source, and cotton firing by dripping is determined by firing cotton, as an indicator, in a about 300 mm lower location from a bottom portion of a test piece, using a dripping material of a test piece). In addition, flame retardancy levels are classified according to Table 3 below.

TABLE 3

| | Classification | | |
|---|---|---|---|
| | V0 | V1 | V2 |
| Burning time (first and second burning respectively) | 10 sec or less | 30 sec or less | 30 sec or less |
| Second burning + glowing | 30 sec or less | 60 sec or less | 60 sec or less |
| Total burning time | 50 sec or less | 250 sec or less | 250 sec or less |
| Cotton ignition by dripping | No | No | Yes |

TABLE 4

| | Examples | | Comparative Examples | | | | |
|---|---|---|---|---|---|---|---|
| Classification | 1 | 2 | 1 | 2 | 3 | 4 | 5 |
| Tensile strength (MPa) | 98 | 95 | 80 | 86 | 88 | 70 | 73 |
| Flexural strength (MPa) | 143 | 140 | 130 | 133 | 135 | 120 | 125 |
| Flexural modulus (MPa) | 4,390 | 4,280 | 4,010 | 4,098 | 4,020 | 3,750 | 3,960 |
| Izod notch impact strength (J/m) | 142 | 146 | 66 | 72 | 81 | 98 | 116 |
| ESCR (120 hours) | OK | OK | Crazing | Crazing | OK | OK | OK |
| Flame retardancy (UL 94, 1.5 mm) | V1 | V1 | V1 | V1 | V1 | V1 | V1 |

As shown in Table 4, it can be confirmed that Comparative Example 1 not including all of D, E, F and G does not satisfy properties required in regard to particularly impact strength and environmental stress cracking resistance (ESCR).

In addition, it can be confirmed that, in Comparative Example 3, an epoxy resin having a high equivalent is added and thus mechanical strength and impact strength are increased, but impact strength is remarkably low, compared to Comparative Example 2. FIG. 1 illustrates SEM images for fracture of (a) a flame-retardant resin composition to which an epoxy resin is not added and (b) a flame-retardant resin composition to which an epoxy resin is added. As illustrated in FIG. 1, it can be confirmed that, when the epoxy resin having a high equivalent is added, interfacial bonding force between a matrix resin and glass fiber is increased.

In addition, it can be confirmed that, in Comparative Example 4 in which the ethylene terpolymer and epoxy resin are not included and Comparative Example 5 in which only the epoxy resin is included, impact strength is enhanced, but tensile strength and flexural modulus are decreased.

On the other hand, it can be confirmed that, in Examples 1 and 2 in which all of the polyphenylene ether resin containing glass fiber, the ethylene terpolymer and the epoxy resin are included, compatibility with glass fiber and environmental stress cracking resistance (ESCR) of the flame-retardant resin composition are enhanced and mechanical strength and impact resistance are increased.

TABLE 5

| | Examples | | Comparative Examples | | |
|---|---|---|---|---|---|
| Classification | 3 | 4 | 6 | 7 | 8 |
| flow index (g/10 min) | 17 | 9.2 | 25.6 | 24.1 | 3.3 |
| tensile strength (MPa) | 95 | 98 | 74 | 78 | 82 |
| flexural strength (MPa) | 146 | 148 | 118 | 124 | 131 |
| flexural modulus (MPa) | 4,280 | 4,290 | 3,730 | 3,862 | 4,101 |

As shown in Table 5, it can be confirmed that, in Comparative Examples 6 and 7 in which the maleic anhydride-grafted polyphenylene ether is not included or is included in a small amount, liquidity of the flame-retardant resin composition is increased, but tensile strength, flexural strength and flexural modulus are decreased.

In addition, in Comparative Example 8 in which the maleic anhydride-grafted polyphenylene ether is added in a large amount, tensile strength, flexural strength and flexural modulus are relatively enhanced, but liquidity is rapidly decreased due to increased melt viscosity of the flame-retardant resin composition and thus moldability deteriorates.

On the other hand, it can be confirmed that, in Examples 3 and 4 in which the maleic anhydride-grafted polyphenylene ether is included in an amount of 4 to 10% by weight, required liquidity is satisfied and tensile strength, flexural strength and flexural modulus are enhanced.

Accordingly, it can be confirmed that, in the flame-retardant polyphenylene ether resin compositions according to Examples 1 to 4 in which particularly glass fiber, maleic anhydride-grafted polyphenylene ether, a thermoplastic styrenic elastomer, an ethylene terpolymer and an epoxy resin are added to the polyphenylene ether resin, flame retardancy and mechanical strength such as tensile strength, and flexural strength, flexural modulus are superior and, due to addition of glass fiber, environmental stress cracking resistance and impact resistance are enhanced, compared to a conventional material.

As described above, the flame-retardant polyphenylene ether resin composition according to the present disclosure prepared by adding particularly glass fiber, maleic anhydride-grafted polyphenylene ether, a thermoplastic styrenic elastomer, an ethylene terpolymer and an epoxy resin to a polyphenylene ether resin, has superior flame retardancy and superior mechanical strength such as superior tensile strength, flexural strength, flexural modulus, etc.

In addition, due to addition of glass fiber, environmental stress cracking resistance and impact resistance are enhanced compared to a conventional material. Accordingly, the flame-retardant polyphenylene ether resin composition may be used as a material of automobile battery cell modules or electric/electronic components requiring superior mechanical properties, flame retardancy and impact resistance.

The disclosure has been described in detail with reference to various forms thereof. However, it will be appreciated by those skilled in the art that changes may be made in these forms without departing from the principles and spirit of the disclosure, the scope of which is defined in the appended claims and their equivalents.

What is claimed is:

1. A flame-retardant polyphenylene ether resin composition comprising:
    20 to 50% by weight of non-maleic anhydride-grafted polyphenylene ether; of polyphenylene ether;
    4 to 10% by weight of maleic anhydride-grafted polyphenylene ether;
    10 to 40% by weight of a rubber-modified polystyrene resin;
    1 to 5% by weight of a thermoplastic styrenic elastomer;
    1 to 5% by weight of an ethylene terpolymer in which ethylene, methyl acrylate and glycidyl methacrylate are copolymerized; and
    5 to 20% by weight of glass fiber,
    wherein the flame-retardant polyphenylene ether resin composition has a flow index of 9.2 to 17 g/10 min that is measured by ASTM D1238 (measurement temperature of 285° C. with a measurement load of 5 kg),
    wherein the maleic anhydride-grafted polyphenylene ether is grafted with 0.3 to 1% by weight of maleic anhydride,
    wherein the maleic anhydride-grafted polyphenylene ether has particularly an intrinsic viscosity of 0.1 to 0.9 dl/g that is measured at 25° C. and in chloroform solvent.

2. The flame-retardant polyphenylene ether resin composition according to claim 1, wherein the rubber-modified polystyrene resin is a copolymer of a monomer copolymerizable with a styrene-based monomer and the styrene-based monomer or a styrene-based graft copolymer.

3. The flame-retardant polyphenylene ether resin composition according to claim 2, wherein the styrene-based monomer is one or more selected from the group consisting of styrene, α-methylstyrene and p-methylstyrene, and a monomer copolymerizable with the styrene-based monomer is one or more selected from the group consisting of vinyl cyanide monomer, (meth)alkyl ester acrylate monomer and maleimide-based monomer.

4. The flame-retardant polyphenylene ether resin composition according to claim 2, wherein the styrene-based graft copolymer is one or more selected from the group consisting of an impact-resistant polystyrene resin (HIPS resin), an acrylonitrile-butadiene-styrene resin (ABS resin), an acrylonitrile-ethylene propylene rubber-styrene resin (AES resin) and an acrylonitrile-acrylate-styrene resin (AAS resin).

5. The flame-retardant polyphenylene ether resin composition according to claim 1, wherein the thermoplastic styrenic elastomer is one or more selected from the group consisting of a polystyrene-polyisoprene copolymer, a polyalphamethylstyrene-polybutadiene copolymer, a polystyrene-polybutadiene-polystyrene copolymer, a polystyrene-polyisoprene-polystyrene copolymer, a polyalphamethylstyrene-polybutadiene-polyalphamethylstyrene copolymer, a polyalphamethylstyrene-polyisoprene-polyalphamethylstyrene copolymer and hydrogenated copolymers thereof.

6. The flame-retardant polyphenylene ether resin composition according to claim 1, wherein the ethylene terpolymer is a copolymer comprising 55 to 75% by weight of ethylene, 20 to 30% by weight of methyl acrylate and 5 to 15% by weight of glycidyl methacrylate.

7. The flame-retardant polyphenylene ether resin composition according to claim 1, wherein the ethylene terpolymer has a melting index of 4 to 8 g/10 min (190° C., 2.16 kg).

8. The flame-retardant polyphenylene ether resin composition according to claim 1, wherein the glass fiber is surface-treated with epoxysilane.

9. The flame-retardant polyphenylene ether resin composition according to claim 1, wherein the glass fiber has an average length of 1 to 10 mm and an average diameter of 5 to 15 μm.

10. The flame-retardant polyphenylene ether resin composition according to claim 1, wherein the flame-retardant polyphenylene ether resin composition further comprises 5 to 10% by weight of a flame retardant, 0.1 to 1 by weight of an epoxy resin, 0.1 to 2% by weight of an antioxidant and 0.1 to 2% by weight of a dispersing agent.

11. The flame-retardant polyphenylene ether resin composition according to claim 10, wherein the flame retardant is a mixture of aromatic polyphosphate and melamine polyphosphate.

12. The flame-retardant polyphenylene ether resin composition according to claim 10, wherein the epoxy resin has an equivalent of 2,220 to 2,860 g/eq, an epoxy value of 0.035 to 0.045 eq/100 g, and a softening point of 120 to 150° C.

* * * * *